US007804506B2

(12) United States Patent
Bates et al.

(10) Patent No.: US 7,804,506 B2
(45) Date of Patent: *Sep. 28, 2010

(54) SYSTEM AND METHOD FOR TRACKING AN OBJECT IN A VIDEO AND LINKING INFORMATION THERETO

(75) Inventors: Daniel Louis Bates, Manhattan Beach, CA (US); Jorge Geaga, Los Angeles, CA (US); Glenn Christopher Arnold, Knoxville, TN (US); Thach Cam Le, Irvine, CA (US); Ann Marie Kaesman, Los Angeles, CA (US); Thomas Jaroszewicz, West Hills, CA (US)

(73) Assignee: Creatier Interactive, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/786,777

(22) Filed: Feb. 25, 2004

(65) Prior Publication Data

US 2004/0227768 A1 Nov. 18, 2004

Related U.S. Application Data

(63) Continuation of application No. 09/944,543, filed on Aug. 31, 2001, now Pat. No. 6,774,908, which is a continuation-in-part of application No. 09/679,391, filed on Oct. 3, 2000.

(51) Int. Cl.
G09G 5/02 (2006.01)
G06K 9/00 (2006.01)

(52) U.S. Cl. .................... 345/589; 382/103
(58) Field of Classification Search ........... 345/475, 345/473, 474, 581, 589; 382/103, 100; 725/135
See application file for complete search history.

(56) References Cited

U.S. PATENT DOCUMENTS 3,878,557 A * 4/1975 Vidovic ..................... 386/4

(Continued)

FOREIGN PATENT DOCUMENTS

EP 0 615 223 A1 9/1994

(Continued)

OTHER PUBLICATIONS

Sabat et al., "Cluster-based smoothing for MPEG-based video-on-demand systems", IEEE, Apr. 2001, p. 339-346.*

(Continued)

Primary Examiner—Ryan R Yang
(74) Attorney, Agent, or Firm—Katten Muchin Rosenman LLP

(57) ABSTRACT

An image processing system for use in development and playback of interactive video. In a development mode of operation, pixel or video objects are selected in a frame by way of a development graphical user interface. The system automatically tracks the selected pixel objects in the preceding and succeeding video frames by determining range limits for various color variables of the selected pixel object to compensate for the effects in lighting changes and decompression effects. The system automatically locates pixel objects within the calculated range limits in the preceding and succeeding video frames and generates a pixel object file which identifies the coordinates of the selected pixel object in each frame. The pixel object file is linked to a data object file which links the selected pixel objects to data objects. The pixel object file and data object file, collectively "linked video files," are created during a development mode of operation. During a playback mode of operation, the linked video files are imported to a video hosting platform which includes a video playback application and a common media player application programming interface (API) for playback of the video content. The video playback application supports processing of the linked video files to enable pixel objects to be selected by a pointing device and linked to data objects by way of a client side graphical user interface.

23 Claims, 9 Drawing Sheets

U.S. PATENT DOCUMENTS

| | | | |
|---|---|---|---|
| 4,719,584 A | 1/1988 | Rue et al. |
| 4,758,714 A | 7/1988 | Carlson et al. |
| 4,797,920 A | 1/1989 | Stein |
| 4,924,303 A | 5/1990 | Brandon et al. |
| 4,969,189 A | 11/1990 | Ohta et al. |
| 5,053,607 A | 10/1991 | Carlson et al. |
| 5,125,022 A | 6/1992 | Hunt et al. |
| 5,204,749 A * | 4/1993 | Toyama et al. ............. 348/352 |
| 5,297,194 A | 3/1994 | Hunt et al. |
| 5,343,529 A | 8/1994 | Goldfine et al. |
| 5,430,809 A | 7/1995 | Tomitaka |
| 5,463,728 A | 10/1995 | Blahut et al. |
| H1506 H | 12/1995 | Beretta |
| 5,475,756 A | 12/1995 | Merritt |
| 5,517,605 A | 5/1996 | Wolf |
| 5,590,261 A | 12/1996 | Sclaroff et al. |
| 5,659,742 A | 8/1997 | Beattie et al. |
| 5,677,955 A | 10/1997 | Doggett et al. |
| 5,684,715 A | 11/1997 | Palmer |
| 5,708,845 A | 1/1998 | Wistendahl et al. |
| 5,724,091 A | 3/1998 | Freeman et al. |
| 5,729,741 A | 3/1998 | Liaguno et al. |
| 5,737,553 A | 4/1998 | Bartok |
| 5,745,103 A | 4/1998 | Smith |
| 5,751,286 A | 5/1998 | Barber et al. |
| 5,752,160 A | 5/1998 | Dunn |
| 5,767,894 A | 6/1998 | Fuller et al. |
| 5,774,666 A | 6/1998 | Portuesi |
| 5,775,995 A | 7/1998 | Okamoto |
| 5,778,187 A | 7/1998 | Monteiro et al. |
| 5,781,228 A | 7/1998 | Sposato |
| 5,793,414 A | 8/1998 | Shaffer |
| 5,794,249 A | 8/1998 | Orsolini et al. |
| 5,818,440 A | 10/1998 | Allibhoy et al. |
| 5,819,286 A | 10/1998 | Yang et al. |
| 5,822,530 A | 10/1998 | Brown |
| 5,841,978 A | 11/1998 | Rhoads |
| 5,867,208 A | 2/1999 | McLaren |
| 5,867,584 A * | 2/1999 | Hu et al. ..................... 382/103 |
| 5,872,857 A | 2/1999 | Chodos et al. |
| 5,874,985 A | 2/1999 | Matthews, III |
| 5,875,303 A | 2/1999 | Huizer et al. |
| 5,885,086 A | 3/1999 | Gerber et al. |
| 5,893,110 A | 4/1999 | Weber et al. |
| 5,900,906 A | 5/1999 | Murakumo et al. |
| 5,903,816 A | 5/1999 | Broadwin et al. |
| 5,903,830 A | 5/1999 | Joao et al. |
| 5,907,323 A | 5/1999 | Lawler et al. |
| 5,907,597 A | 5/1999 | Mark |
| 5,912,980 A * | 6/1999 | Hunke ......................... 382/103 |
| 5,929,849 A | 7/1999 | Kikinis |
| 5,929,850 A | 7/1999 | Broadwin et al. |
| 5,931,908 A | 8/1999 | Gerba et al. |
| 5,933,005 A | 8/1999 | Pugh |
| 5,937,404 A | 8/1999 | Csaszar et al. |
| 5,973,692 A | 10/1999 | Knowlton et al. |
| 5,983,244 A | 11/1999 | Nation |
| 5,987,454 A | 11/1999 | Hobbs |
| 5,987,509 A | 11/1999 | Portuesi |
| 6,005,602 A | 12/1999 | Matthews, III |
| 6,006,241 A | 12/1999 | Purnaveja |
| 6,006,256 A | 12/1999 | Zdepski et al. |
| 6,008,816 A | 12/1999 | Eisler et al. |
| 6,008,820 A | 12/1999 | Chauvin et al. |
| 6,016,349 A | 1/2000 | Musa |
| 6,016,504 A | 1/2000 | Arnold et al. |
| 6,018,748 A | 1/2000 | Smith |
| 6,026,411 A | 2/2000 | Delp |
| 6,031,541 A | 2/2000 | Lipscomb et al. |
| 6,032,181 A | 2/2000 | Bedgedjian et al. |
| 6,067,401 A | 5/2000 | Abecassis |
| 6,069,630 A | 5/2000 | Lisle et al. |
| 6,070,161 A | 5/2000 | Higashio |
| 6,070,176 A | 5/2000 | Downs et al. |
| 6,076,104 A | 6/2000 | McCue |
| 6,154,879 A | 11/2000 | Pare, Jr. et al. |
| 6,161,108 A | 12/2000 | Ukigawa et al. |
| 6,164,528 A | 12/2000 | Hills et al. |
| 6,169,573 B1 | 1/2001 | Sampath-Kumar et al. |
| 6,184,878 B1 | 2/2001 | Alonso et al. |
| 6,188,777 B1 | 2/2001 | Darrell et al. |
| 6,198,833 B1 * | 3/2001 | Rangan et al. ............... 382/103 |
| 6,202,151 B1 | 3/2001 | Musgrave et al. |
| 6,204,843 B1 | 3/2001 | Freeman et al. |
| 6,205,231 B1 | 3/2001 | Isadore-Barreca et al. |
| 6,209,025 B1 | 3/2001 | Bellamy |
| 6,222,937 B1 | 4/2001 | Cohen et al. |
| 6,240,555 B1 | 5/2001 | Shoff et al. |
| 6,252,586 B1 | 6/2001 | Freeman et al. |
| 6,253,238 B1 | 6/2001 | Lauder et al. |
| 6,256,785 B1 | 7/2001 | Klappert et al. |
| 6,269,348 B1 | 7/2001 | Pare, Jr. et al. |
| 6,275,989 B1 | 8/2001 | Broadwin et al. |
| 6,337,696 B1 | 1/2002 | Lindhorst et al. |
| 6,337,916 B1 | 1/2002 | Boyd et al. |
| 6,357,042 B2 | 3/2002 | Srinivasan et al. |
| 6,397,181 B1 | 5/2002 | Li et al. |
| 6,411,725 B1 * | 6/2002 | Rhoads ........................ 382/100 |
| 6,424,370 B1 * | 7/2002 | Courtney .................... 348/143 |
| 6,457,018 B1 | 9/2002 | Rubin |
| 6,493,707 B1 | 12/2002 | Dey et al. |
| 6,496,981 B1 | 12/2002 | Wistendahl et al. |
| 6,536,043 B1 | 3/2003 | Guedalia |
| 6,549,643 B1 * | 4/2003 | Toklu et al. .................. 382/107 |
| 6,603,921 B1 | 8/2003 | Kanevsky et al. |
| 6,625,315 B2 | 9/2003 | Laumeyer et al. |
| 6,637,032 B1 * | 10/2003 | Feinleib ....................... 725/110 |
| 6,642,940 B1 | 11/2003 | Dakss et al. |
| 6,697,796 B2 | 2/2004 | Kermani |
| 6,724,915 B1 * | 4/2004 | Toklu et al. .................. 382/103 |
| 6,741,655 B1 | 5/2004 | Chang et al. |
| 6,744,908 B2 | 6/2004 | Chujoh et al. |
| 6,819,797 B1 | 11/2004 | Smith et al. |
| 6,859,799 B1 | 2/2005 | Yuen |
| 6,925,474 B2 | 8/2005 | McGrath et al. |
| 6,990,448 B2 | 1/2006 | Charlesworth et al. |
| 7,003,156 B1 | 2/2006 | Yamamoto et al. |
| 7,020,192 B1 | 3/2006 | Yamaguchi et al. |
| 7,024,020 B2 | 4/2006 | Lee et al. |
| 7,032,182 B2 | 4/2006 | Prabhu |
| 7,054,812 B2 | 5/2006 | Charlesworth et al. |
| 7,178,107 B2 | 2/2007 | Sezan et al. |
| 2002/0056136 A1 | 5/2002 | Wistendahl et al. |
| 2002/0069218 A1 | 6/2002 | Sull et al. |
| 2002/0087530 A1 | 7/2002 | Smith et al. |
| 2003/0122860 A1 | 7/2003 | Ino |
| 2003/0226150 A1 | 12/2003 | Berberet et al. |
| 2004/0215660 A1 | 10/2004 | Ikeda |
| 2004/0233233 A1 | 11/2004 | Salkind et al. |
| 2005/0022107 A1 | 1/2005 | Dey et al. |
| 2005/0044056 A1 | 2/2005 | Ray et al. |
| 2005/0044105 A1 | 2/2005 | Terrell |
| 2005/0086703 A1 | 4/2005 | Gupta et al. |
| 2005/0128318 A1 | 6/2005 | Leow et al. |
| 2005/0182759 A1 | 8/2005 | Yuen |
| 2005/0223031 A1 | 10/2005 | Zisserman et al. |
| 2005/0223034 A1 | 10/2005 | Kaneko et al. |
| 2005/0271304 A1 | 12/2005 | Retterath et al. |
| 2006/0082662 A1 | 4/2006 | Isaacson |
| 2006/0271594 A1 | 11/2006 | Haberman |

FOREIGN PATENT DOCUMENTS

| | | |
|---|---|---|
| EP | 0 624 040 A2 | 11/1994 |

| | | | |
|---|---|---|---|
| GB | 2327837 A | 2/1999 | |
| JP | 19970185491 | 4/1998 | |
| JP | 11-292512 A | 10/1999 | |
| WO | WO 97/12342 | 3/1997 | |
| WO | WO 97/30551 | 8/1997 | |
| WO | 98/28907 A2 | 7/1998 | |
| WO | 98/44435 A1 | 10/1998 | |
| WO | 03/041393 A3 | 5/2003 | |

OTHER PUBLICATIONS

U.S. Appl. No. 10/219,175, filed Aug. 15, 2002.

U.S. Appl. No. 10/786,777, filed Feb. 25, 2004.

Xiaoping Hu, et al., "Feature Extraction and Matching as Signal Detection," International Journal of Pattern Recognition and Artificial Intelligence, (1994), pp. 1343-1379.

S. M. Smith, "Real-Time Motion Segmentation and Object Tracking", Oxford Centre for Functional Magnetic Resonance Imaging of the Brain, Feb. 19, 2004, 34 pages.

Dakss J. et al., "Hyperlinked Video," Proceedings of the SPIE, vol. 3528, Nov. 1999, pp. 2-10.

European Search Report from EP 01 97 5637, dated Oct. 6, 2006.

European Search Report EP 02789565.

European Search Report from EP 01 97 5637, dated Aug. 6, 2006.

ASSET-2: Real-Time Motion Segmentation and Object Tracking Technical Report TR95SMS2b, British Crown Copyright 1995, Defence Research Agency, Farnborough, Hampshire GU14 6TD, UK, 34 pages, retrieved from the internet at URL <http:www.fmrib.ox.ac.uk/~steve/asset/asset2/asset2.html> , retrieved on Mar. 18, 2003.

International Search report for PCT/US01/30711, published as WO 02/29544 A1 on Apr. 11, 2002.

S.M. Smith, ASSET-2: Real-Time Motion Segmentation and Object Tracking Technical Report TR95SMS2b, http:/www.fmrib.ox.ac.uk/~steve/asset/asset2/asset2.html.

Xiaoping Hu et al., "Feature Extraction and Matching as Signal Detection", International Journal of Pattern Recognition and Artificial Intelligence, (1994), pp. 1343-1379, vol. 8 No. 6, World Scientific Publishing Company.

\* cited by examiner

US 7,804,506 B2

SYSTEM AND METHOD FOR TRACKING AN OBJECT IN A VIDEO AND LINKING INFORMATION THERETO

CROSS-REFERENCE TO RELATED APPLICATIONS

This application is a continuation of U.S. patent application Ser. No. 09/944,543, filed on Aug. 31, 2001, now U.S. Pat. No. 6,774,908, which is a continuation-in-part of commonly-owned, co-pending patent application Ser. No. 09/679,391, filed Oct. 3, 2000, entitled "Method and Apparatus for Associating the Color of an Object with an Event".

COMPUTER LISTING APPENDIX

This application includes computer program listing appendix on compact disc, hereby incorporated by reference.

BACKGROUND OF THE INVENTION

1. Field of the Invention

The present invention relates to an interactive video system and more particularly to a system and method for creating and playback of interactive video. In a development mode of operation, the system automatically tracks a pixel object in a video sequence that has been selected in a video frame and generates one or more linked video files representative of the location of the selected object in all of the frames in the sequence, along with links to data objects for use in conjunction with an interactive video system. In a playback mode of operation, the system enables the pixel objects to be selected during subsequent playback of the video frames with a pointing device, such as a mouse, providing access to linked data objects.

2. Description of the Prior Art

There is a trend toward interactive video for various commercial, educational and entertainment purposes. To provide such interactivity, video content producers need to link various desired video or pixel objects within each of the video frames of the video content with data objects, such as web pages. In order to provide links for selected pixel objects in the various video frames, video content producers are known to implement image processing techniques for linking selected pixel objects in each of the various video frames to other platforms. Both manual and automatic image processing techniques are known.

Examples of systems in which the links are manually "authored" are disclosed in U.S. Pat. Nos. 5,774,666; 6,076,104 and 5,929,849. In general, manual image processing techniques involve editing each video frame in a video sequence and manually embedding links or hot spots in each of the frames for the desired pixel objects. Such a task is extremely labor intensive and thus expensive to implement. For example, a 30-minute television show is known to include 22 minutes of video content and 8 minutes of advertising inserts. At a playback rate of 30 frames per second, the 22 minutes of video content is comprised of (30 frames/second× 60 seconds/minute×22 minutes) 39,600 frames. In order to provide the ability for interactivity, a video content producer thus would need to edit 39,600 frames for a 22-minute broadcast and embed links in each of the frames for one or more various objects. As mentioned above, such a task is extremely labor intensive and thus relatively expensive.

In order to improve image processing of video content for the purpose of providing interactivity by providing links to various objects within the video frames, automatic image processing systems have been developed that are able to automatically track an object in a video frame sequence and link the pixel objects to other platforms. Examples of such automatic authoring systems are disclosed in U.S. Pat. Nos. 6,205,231; 6,169,573 and 5,867,584.

U.S. Pat. No. 6,169,573 relates to a system for tracking objects in a sequence of video frames which track objects in a compressed format using variables encoded in MPEG compressed video content. Unfortunately, the system disclosed in the '573 patent is only useful for tracking objects in MPEG format and is not suitable for use with video content in an uncompressed format or other video format, such as .mov.

U.S. Pat. No. 6,205,231 discloses an image processing system that is able to automatically track an object in a video frame sequence. The system disclosed in the '231 patent incorporates known image processing techniques for tracking an edge of an object based on its color or luminosity characteristics. The system disclosed in the '231 patent "tags" selected objects in the video frame sequence which enables the tags and thus the selected object to be linked to other platforms, such as websites.

There are various problems with the system such as disclosed in the '231 patent, such as inaccurate tracking of the pixel object. In particular, image processing systems, such as disclosed in the '231 patent locate pixel objects within a video frame by locating pixels having a certain color variable value. Unfortunately, the color variable values for an object may change from scene to scene due to lighting effects or due to the effects of the decompression. The system disclosed in the '231 patent does not compensate for such changes and thus is not able to accurately track pixel objects in a video frame sequence. In addition, embedding tags in the original video content is resource intensive requiring relatively high level computing platforms.

U.S. Pat. No. 5,867,584 also relates to an image processing system for automatically tracking objects in a video frame sequence. This system attempts to anticipate the position of the selected object in succeeding frames by generating a number of virtual wire frames along a predetermined anticipatory trajectory of the pixel object in succeeding frames and comparing the pixel variables within the test windows of the anticipatory trajectory with the original test window. As such, the system disclosed in the '584 patent is resource intensive. In addition, the system utilizes known image processing techniques based on the intensity characteristic of the pixels within the windows. As such, the system disclosed in the '584 patent does not take into account changes in brightness and shifts in the hue due to lighting effects in the video frame and thus is unable to accurately track an object in a sequence of video frames. Thus, there is a need for image processing system for automatically tracking a selected object in a video frame sequence that is able to relatively accurately track the object and is not resource intensive.

SUMMARY OF THE INVENTION

The present invention relates to an image processing system for use in development and playback of interactive video. In a development mode of operation, pixel or video objects are selected in a frame by way of a developmental graphical user interface. The system automatically tracks the selected pixel objects in the preceding and succeeding video frames by determining range limits for various color variables of the selected pixel object to compensate for the effects in lighting changes and decompression effects. The system automatically locates pixel objects within the calculated range limits in the preceding and succeeding video frames and generates a pixel object file which identifies the coordinates of the selected pixel object in each frame. The pixel object file is linked to a data object file which links the selected pixel objects to data objects. The pixel object file and data object file, collectively "linked video files," are created during a development mode of operation. During a playback mode of operation, the linked video files are imported to a video hosting platform which includes a video playback application and a common media player application programming interface (API) for playback of the video content. The video playback application supports processing of the linked video files to enable pixel objects to be selected by a pointing device and linked to data objects by way of a client side graphical user interface.

DESCRIPTION OF THE DRAWINGS

These and other advantages of the present invention will be readily understood with reference to the following specification and attached drawing wherein.

DETAILED DESCRIPTION OF THE INVENTION

The present invention relates to a system and method for providing interactivity to various types of video content, such as streaming video content and on-demand video content, for example, from a DVD player. In a development mode of operation, the present invention includes an image processing system for automatically tracking a pixel object, selected in a frame of a video frame sequence, in preceding and succeeding video frames for the purpose of linking the selected object to one or more data objects, such as a uniform resource locator, fixed overlay information, a streaming video link, database interaction link or other resource platform (hereinafter "data object"). In accordance with an important aspect of the invention, the image processing system compensates for changes in brightness and shifts in hue on a frame by frame basis due to lighting effects and decompression effects by determining range limits for various color variable values, such as hue (H), red-green (R-G), green-blue (G-13) and saturation value$^2$ ($SV^2$) to provide relatively accurate tracking of a pixel object. Moreover, unlike some known image processing systems, the image processing system that forms part of the present invention does not embed tags in the video content. Rather the system, in accordance with the present invention, generates linked video files, which identify the pixel coordinates of the selected pixel object in each video frame as well as data object links associated with each pixel object. The linked video files are exported to a playback platform which includes a video playback application which supports playback of content of various compression schemes such as those used by various commonly known media players, such as Real Player, Windows Media Player and Quick Time and enables pixel objects to be selected during playback with a pointing device, such as a mouse which enables access to linked to data objects. The video playback application may be hosted in a video hosting platform or reside directly within a playback platform.

Figure 2:
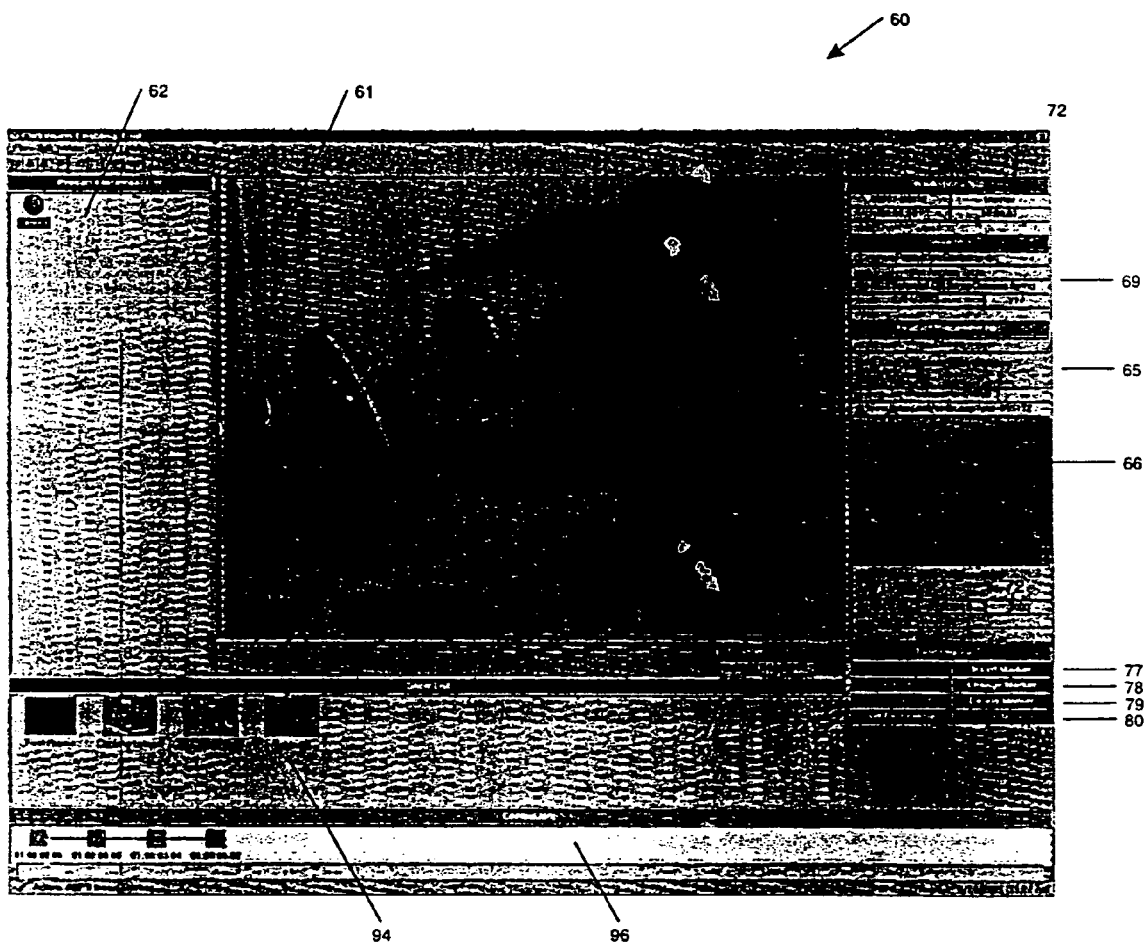
FIG. 2 is a screen shot of a developmental graphical user interface for use in a development mode in the interactive video system in accordance with the present invention.
Figure 3:
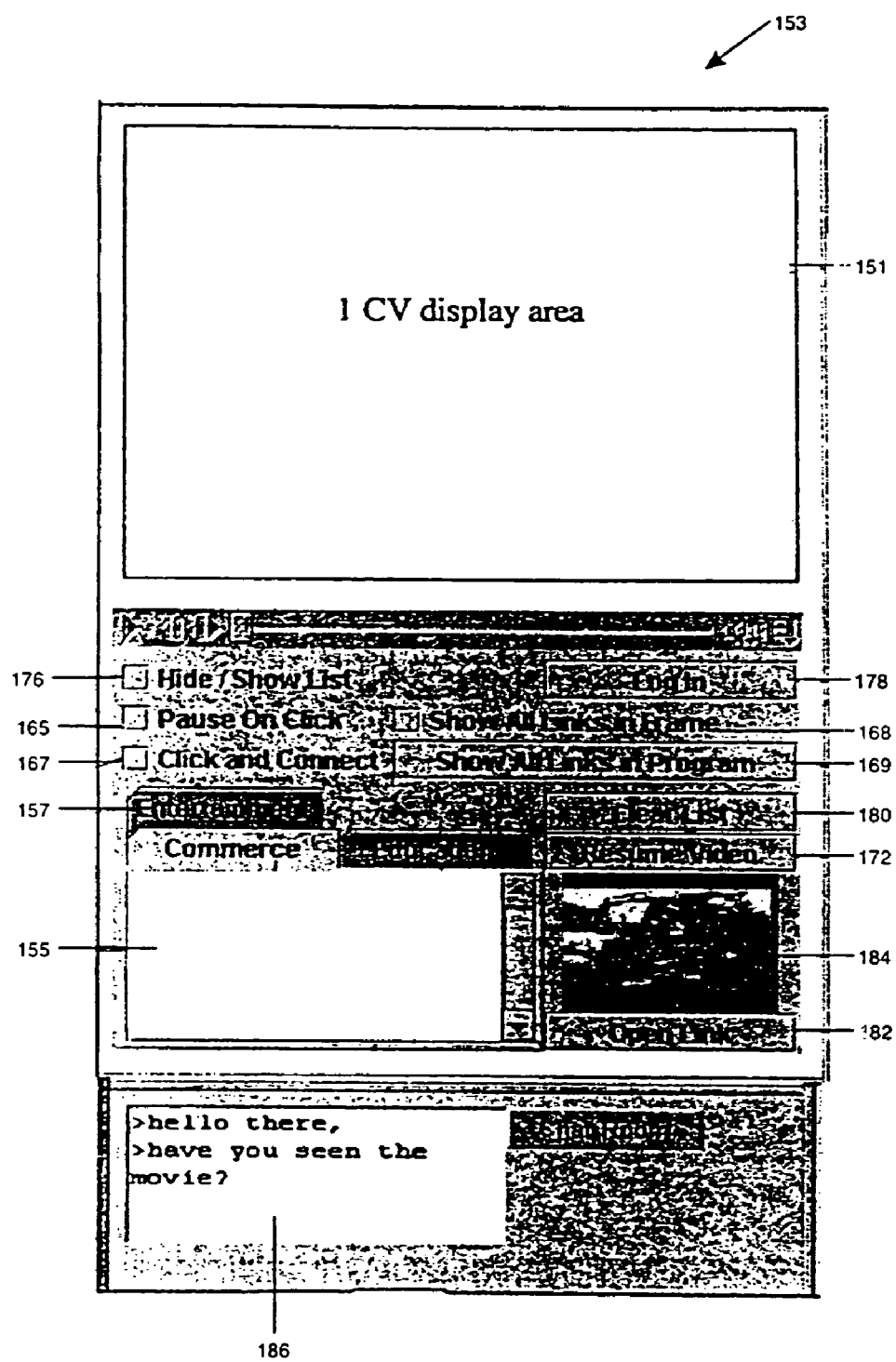
FIG. 3 is a screen shot of a client side graphical user interface for use in a playback mode of the interactive video system in accordance with the present invention.

Graphical user interfaces (GUI) may be provided to facilitate the development of linked video files during a development mode of operation as well as facilitate playback during a playback mode of operation. In particular, a developmental GUI, for example, as illustrated in FIG. 2, may be used to facilitate processing of the original video content by either a video content provider or an application service provider, to develop the linked video files as discussed above. A client side or playback GUI, for example, as illustrated in FIG. 3, may be provided to facilitate playback.

Various embodiments of the invention are contemplated. For example, referring to FIG. 1, the invention may be implemented by way of a resource platform, shown within the dashed box 20, formed from one or more servers or work stations, which may constitute an Application Service Provider or may be part of the video content producer. In this implementation, a source of video content 22, for example, an on-demand source from, for example, a DVD player or streaming video source from a video content producer, is transferred to the resource platform 20, which, in turn, processes the video content 22 and links selected pixel objects within the video content 22 to data objects and generates linked video files 24.

Figure 1:
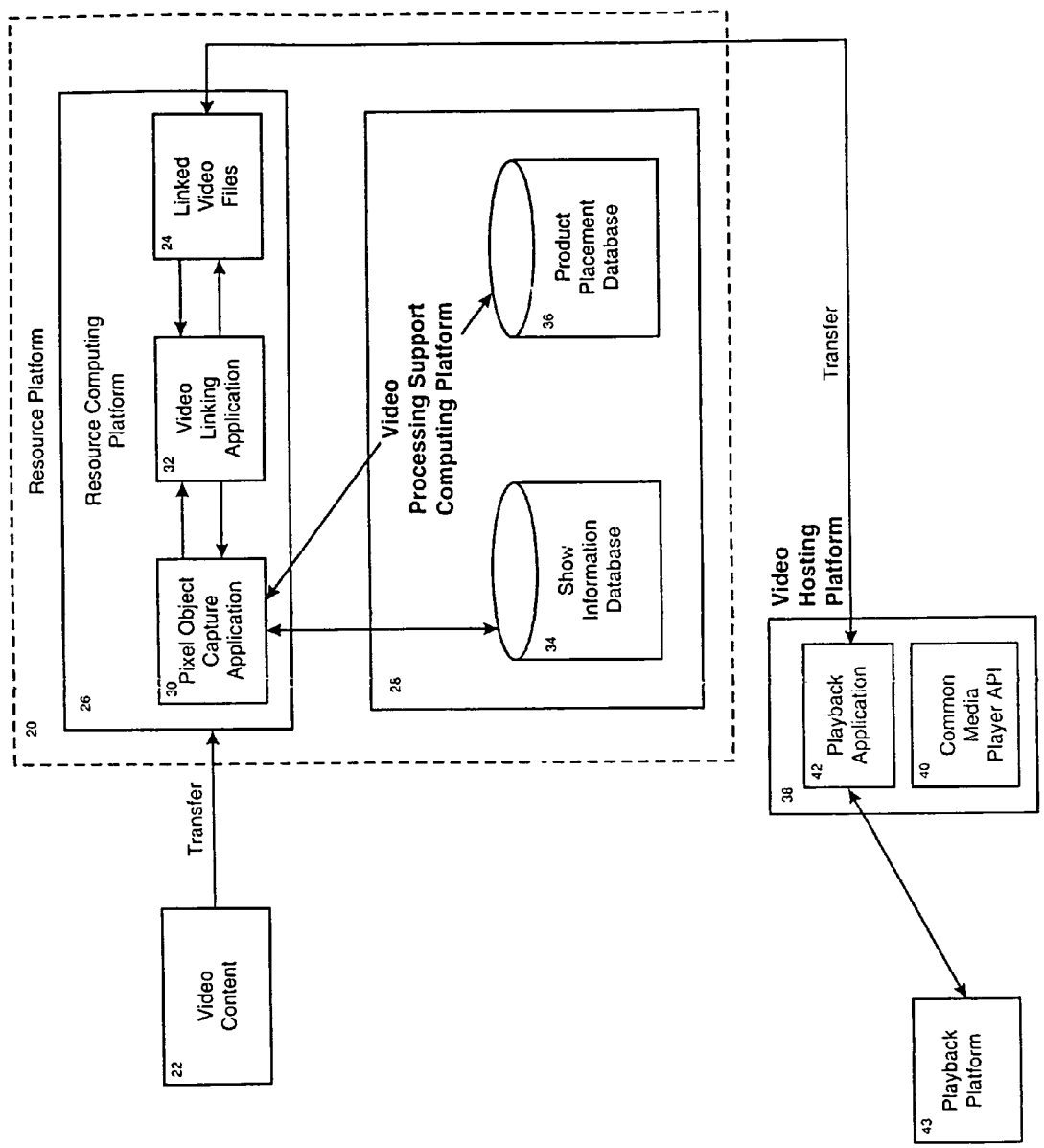
FIG. 1 is a block diagram of an interactive video system in accordance with the present invention.

The resource platform 20 is used to support a development mode of operation in which the linked video files 24 are created from the original video content 22. As shown in FIG. 1, the resource platform 20 may include an exemplary resource computing platform 26 and a video processing support computing platform 28. The resource computing platform 26 includes a pixel object capture application 30, a video linking application 32 and generates the linked video files 24 as discussed above. The pixel object capture application 30 is used to capture a pixel object selected in a frame of video content 22. The video linking application 32 automatically tracks the selected pixel object in preceding and successive frames in the video sequence and links the pixel objects to data objects by way of a pixel object file and data object file, collectively referred to as linked video files 24.

The resource computing platform 22 may be configured as a work station with dual 1.5 GHz processors, 512 megabits of DRAM, a 60 gigabit hard drive, a DVD-RAM drive, a display, for example, a 21-inch display; a 100 megabit Ethernet card, a hardware device for encoding video and various standard input devices, such as a tablet, mouse and keyboard. The resource computing platform 26 is, preferably provided with third party software to the hardware.

The video processing support computing platform 28 includes a show information database 34 and a product placement database 36. The show information database 34 includes identifying information relative to the video content, such as show name, episode number and the like. The product placement database 36 includes data relative to the various data objects, such as website addresses, to be linked to the selected pixel objects. The show information database 34 as well as the product placement database 36 may be hosted on the video processing support computing platform 28 or may be part of the resource computing platform 26.

In accordance with an important aspect of the invention, the linked video files 24 are created separately from the original video content 22 and are amenable to being exported to a video hosting platform 38 for use during a playback mode of operation. The video hosting platform 38 includes a common media player application programming interface (API) 40 and a playback application 42 for enabling playback of either streaming or on-demand video content with interactivity. In particular, the video playback application 42 enables pixel objects to be selected during playback of the video content by a standard input device, such as a mouse, and linked to data objects, for example, other resource platforms.

As shown in FIG. 1, the video hosting platform 38 is shown separate from the playback platform 43, which may be a personal computing platform or even a set top box. Alternatively, the video hosting platform 38 may be included within the playback platform 43. The video hosting platform 38 may be, for example, a personal computing platform.

Development Mode of Operation

Figure 4:
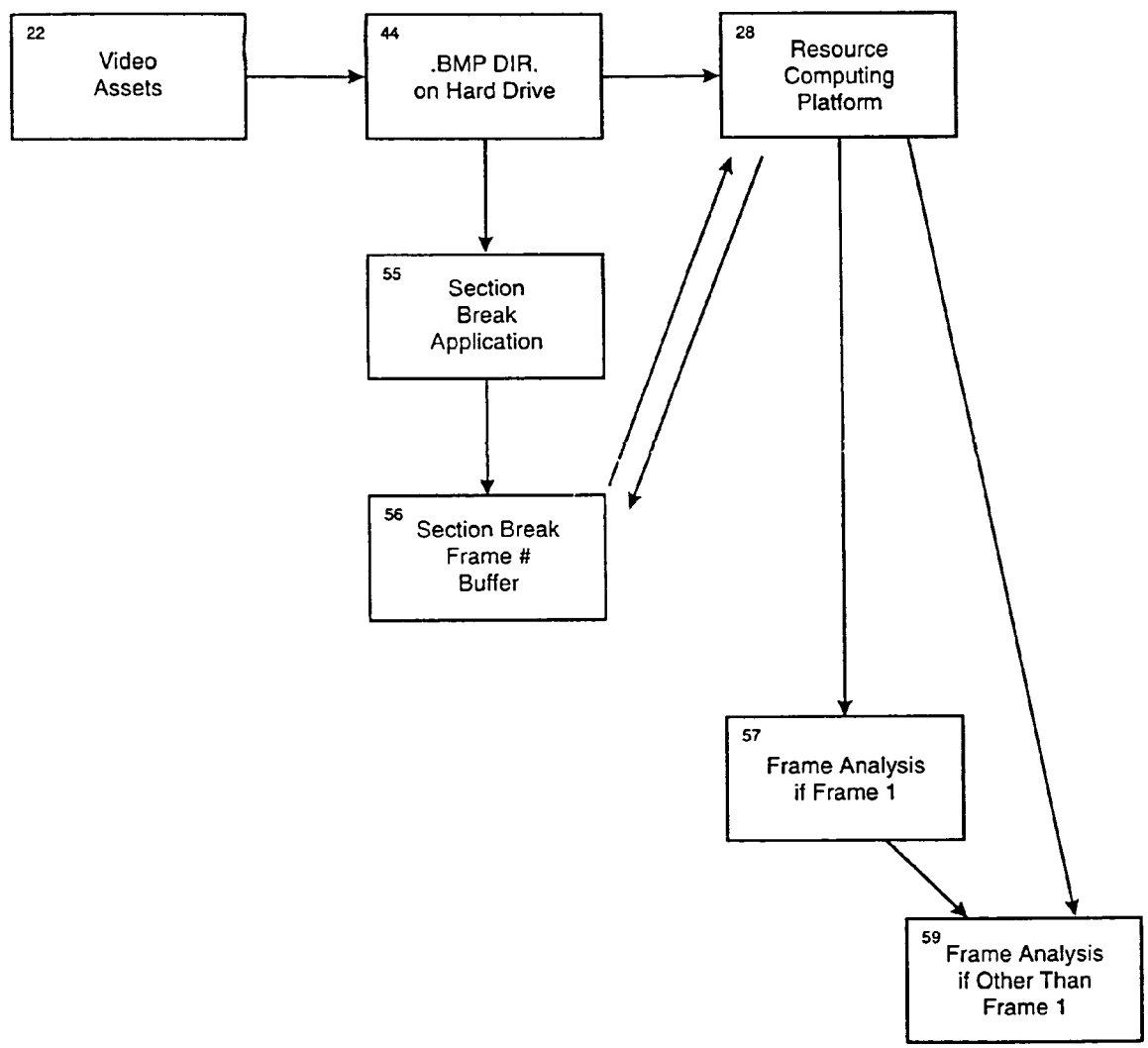
FIG. 4 is a system level software diagram of an image processing portion of the invention.

The development mode of operation is discussed with reference to FIGS. 4-8. Turning to FIG. 4, a video source, such as, a streaming video source, for example, from the Internet or an on-demand video source, such as a DVD player, is imported by the pixel object capture application 30 (FIG. 1) which captures, for example, 12 frames per second of the video content 20 and converts it to a bit map file 44. In particular, the video content 22, for example, in MPEG format, is decompressed using public domain decoder software, available from the MPEG website (www.mpeg.org) developed by the MPEG software simulation group, for example, MPEG 2 DEC, an executable MPEG 2 decoder application. As is known in the art, such MPEG decoder software decodes an entire MPEG file before providing global information on the file itself. Since the video content must be identified by frame for use by the pixel object capture application 30 and the video linking application 32, the frame information may be read from the decoded MPEG file once all of the frames have been decoded or alternatively determined by a frame extraction application which stores the frame information in a memory buffer as the MPEG file is being loaded into the pixel capture application 30 as illustrated in FIG. 5 and described below.

Frame Extraction Application

Figure 5:
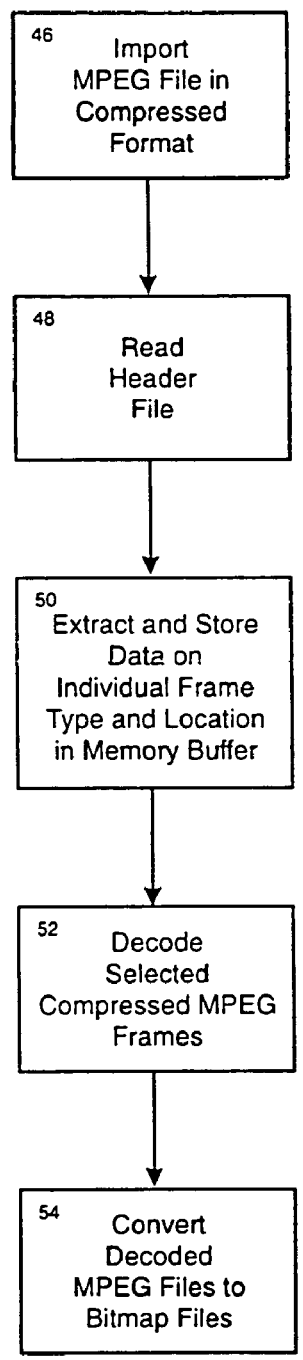
FIG. 5 is a software flow diagram of a frame extraction application in accordance with the present invention.

The frame extraction application is illustrated in FIG. 5 and described below. Referring to FIG. 5, the MPEG file is imported into the pixel object capture application 30 in compressed format in step 46. In this embodiment, the pixel object capture application 30 works in conjunction with the standard MPEG decoder software as illustrated in FIG. 5 to avoid waiting until the entire file is decoded before obtaining the frame information. While the MPEG file is being imported, the pixel object capture application 30 reads the header files of the MPEG data in step 48 and stores data relating to the individual frame type and location in a memory buffer in step 50. As such, the pixel object capture system 30 is able to decode selected frames of the compressed MPEG file without the need for decoding all of the previous frames in step 52. Based upon the frame information stored in the memory buffer in step 50, the decoded MPEG files may then be converted to a bit map file 44 (FIG. 4), as discussed above in step 54.

Section Break Application

The pixel object capture application 30 may optionally be provided with a section break application 55 (FIG. 4) to facilitate downstream processing and aid partitioning of the content among several users. The section break application 55 analyzes the video content during loading. The section break data is stored in a temporary buffer 56 (FIG. 4) and used for pixel object analysis of a selected frame and proceeding and succeeding frames by the pixel object capture application 30 and the video linking application 32.

The section break application 55 automatically analyzes the video content to determine how changes in lighting affect RGB values creating large shifts in these values. In particular, the median average of the pixel values for a series of frames is computed. The section break application 55 compares the changes in the pixel values with the median average. A section break may be determined to be an approximately 5× change in pixel values from the median average. These section breaks are stored in a buffer 56 as a series of sequential frame numbers representing (start frame, end frame) where each start frame equals the proceeding frame plus one frame until the end of the video. This information may be edited by way of the graphical user interface 60 (FIG. 2), discussed below. If changes are made to the frame numbers corresponding to the section breaks, the new information is sent to the section break memory buffer 56 (FIG. 4) where the original information is replaced.

As will be discussed in more detail below, the frames in the video content are analyzed for a selected pixel object during a session with the pixel object capture application 30 (FIG. 1). A pixel object may be selected in any frame of a video sequence 57 (FIG. 4). The video linking application 32 processes preceding and subsequent frames 59 by automatically tracking the selected pixel object and generating linked video files 24 for an entire segment as defined by the segment break application, or for a length of frames determined by the operator. The segment may be as small as a single frame or may include all the frames in the content.

Developmental Graphical User Interface

In order to facilitate development, a developmental graphical user interface 60 may be provided, as illustrated in FIG. 2. As shown, the developmental graphical user interface 60 includes a viewing window 61 for displaying a frame of video content and a number of exemplary data fields to associate information with the video content.

An exemplary product placement list display window 62 is used to provide a graphic list of all of the data objects associated with a particular video frame sequence. The product placement list display window 62 is populated by the product placement database 36 (FIG. 1). The list of data objects is propogated anytime the developmental graphical user interface 60 is created or an existing graphical user interface 60 is opened.

As shown in FIG. 2, available data objects are displayed in the product placement list display window 62 as text and/or icons. In order to facilitate linking of the data objects to various pixel objects within the video frame sequence, the data objects displayed in the product placement display window 62 may be displayed in different colors. For example, one color may be used for data objects which have been linked to pixel objects while a different color may be used for data objects which have not been assigned to pixel objects. Such technology is well within the ordinary skill in the art, for example, as disclosed in U.S. Pat. No. 5,983,244, hereby incorporated by reference.

A "Show Info" data field 64 may also be provided in the developmental graphical user interface 60. The show information data field 64 is populated by the show information database 34 and may include various data associated with the video frame sequence, such as production company name; show name; episode number/name; initial broadcast date; and proposed ratings.

A "Product Placement Info" data field 65 and an associated display 66 may also be provided. The display area 66 is a reduced size image of the image displayed in the display window 61. The Product Placement Info data field 65 include various information regarding the data objects stored in the product placement database 36 (FIG. 1) for a selected data object. For example, these product placement information data object fields may include the following fields: product name; placement description; action, for example, redirect to another server; address of the alternate server; a product identifier; a locator descriptor as well as a plurality of data fields 70, 71 and 72 which indicate the frame locations of the data objects in the product placement list display 62 that have been linked to pixel objects. In particular, the data field 70 indicates the first frame in the video frame sequence in which the data object, identified in the Product Placement Info data field 65 is been linked to a pixel object. Similarly, the data field 71 identifies the last frame in the video frame sequence in which the data object has been linked to a pixel object. Lastly, the data field 72 identifies the total number of frames in the video frame sequence in which the selected data object has been linked to pixel objects.

In order to facilitate automatic authoring of the video frame sequence, the developmental graphical user interface 60 may be provided with a number of control buttons 73-80. These control buttons 73-80 are selected by a pointing device, such as a mouse, and are collectively referred to as "Enabling Tools." A "Set Scope" control button 73, when selected, allows a user to select a pixel object in the display window 61 by way of a point device. An x, y display 92 identifies the x and y coordinates within the display window 61 corresponding to a mouse click by the user in connection with the selection of the pixel object within the display window 61.

A "Set First Frame" control button 76 allows the first frame of the video frame sequence to be selected by the user. Once the "Set First Frame" button 76 is selected, a number of control buttons 82, 84 and 86 as well as a scroll bar 88 may be used to advance or back up the frame being displayed in the display window 61. A counter display 90 is provided which identifies the selected frame.

Once the first frame is selected by the user, as discussed above, a "Bound Object" button 75 may be selected. The Bound Object button 75 causes the system to automatically draw a boundary around the selected pixel object based upon image processing edge boundary techniques as discussed below. The boundary may take the shape of a geometric object, such as a square, rectangle or circle as discussed in more detail below in connection with the pixel object capture application 30. After initial object has been captured, the Track Object button 74 may be selected for initiating automatic tracking or authoring of the selected pixel object in both proceeding and succeeding frames. As will be discussed in more detail below, the pixel object locations video frames and are used to create the linked video files 24.

In order to facilitate development of the linked video file 24, markers may be used under the control of the control buttons 77-80. The markers are used to identify the first frame associated with a marker. For example, a marker display window 94 is provided. The "Insert Marker" button 77 is selected to mark the first frame linked to a specific pixel object. The markers may be displayed in text and include a reduced size version of the marked frame.

The markers can be changed and deleted. The "Change Marker" button 78 allows a marker to be changed. In particular, by selecting the "Change Marker" button 78, the frame associated with that marker can be changed. This may be done by advancing or backing up the video frame sequence until the desired frame is displayed in the display window 61. The current marker and the marker display window 94 may then be changed to refer to a different frame number by simply selecting the "Change Marker" button 78.

A "Delete Marker" button 79 allows markers in the marker display window 94 to be deleted. In order to delete a marker, the marker is simply highlighted in the marker display window 94 and the "Delete Marker" button 79 is selected.

A "Show Marker" button 80 may also be provided. The "Show Marker" button 80 controls the display of markers in the marker display window 94. The "Show Marker" button 80 may be provided with a toggle-type function in which a single click shows the markers in the marker display window 94 and a subsequent click clears the marker display window 94.

Each of the markers are displayed in a content map display window 96. The content map display window 96 displays a linear representation of the entire content with all markers depicted along with the frame numbers where the markers appear.

Pixel Object Capture Application

The pixel object capture application 30 is initiated after the first frame is selected by the user by way of the development graphical user interface 60. In particular, After the section breaks are determined, the estimated first frame of the content is displayed in a viewing window 61 on the graphical user interface 60. Once this frame is loaded in the viewing window 61, the user may choose to specify another frame to be notated as the first frame. This is done to ensure that any extra frames captured with the content that do not actually belong to the beginning of the content can be skipped. The user may select a specific frame as the first frame as discussed above. The selected video frame is then loaded into the viewing window 61 for frame analysis as discussed below. The process of choosing the first frame is only performed once at the beginning of the program content, it is not necessary to do this at the start of each section.

When the viewing window 61 is loaded with content, the resource computing platform 26 accesses the show information database 34 and the product placement database 36 (FIG. 1) to populate the various data fields in the developmental graphical user interface 60 (FIG. 2) as discussed above.

Once a frame has been loaded into the viewing window 61 (FIG. 2) in the developmental graphical user interface 60, pixel objects are selected and captured during a session with the pixel object capture application 30 (FIG. 1). The video linking application 32 automatically tracks the selected pixel objects in the preceding and succeeding frames and generates linked video files 24, which link the selected pixel objects with data objects, stored in the product placement data base 38.

Figure 6A:
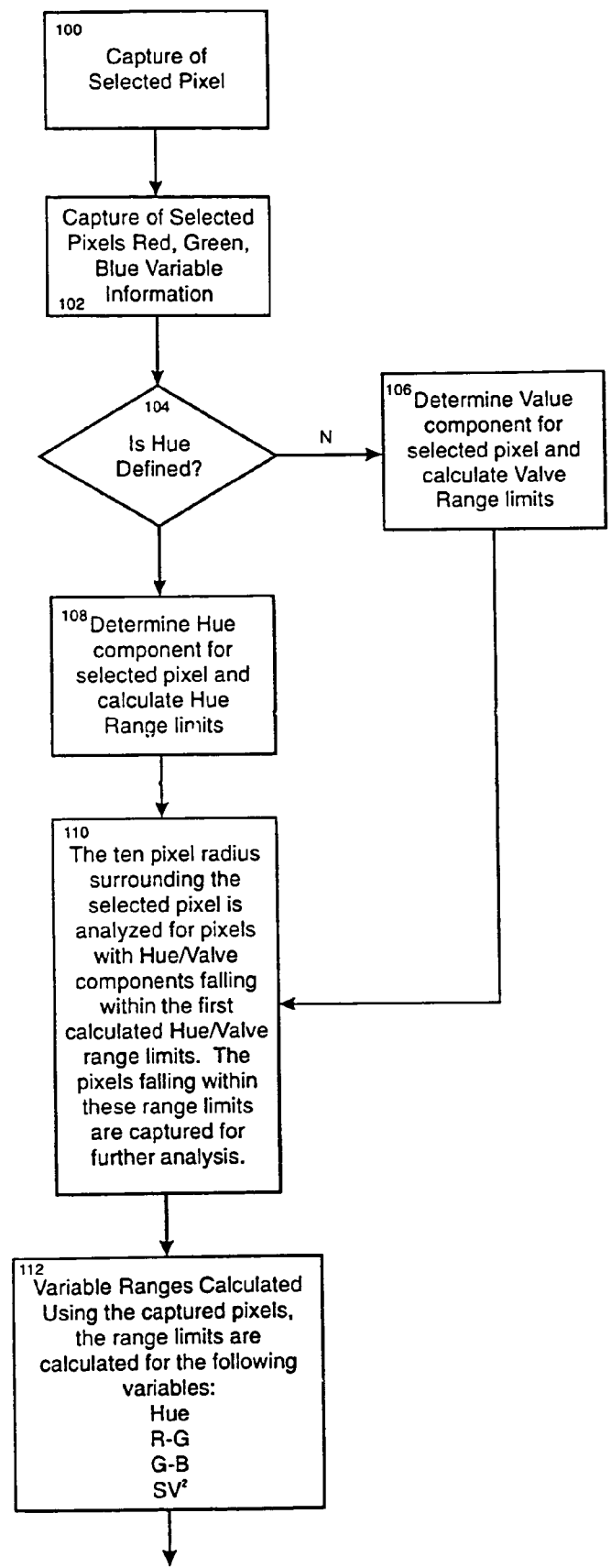
FIGS. 6A and 6B are flow diagrams of the pixel object capture portion of the image processing system in accordance with the present invention.
Figure 6B:
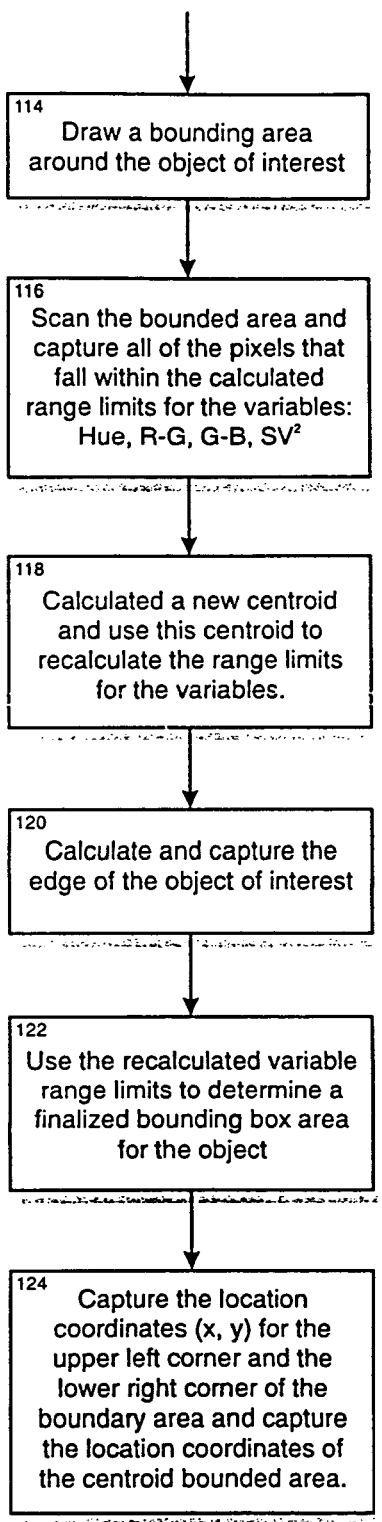

Selection and capturing of a pixel object is illustrated in connection with FIG. 6. In general, a pixel object is visually located in the viewing window 61 (FIG. 2) during a session with the pixel object capture application 30 by selecting a pixel in a single frame corresponding to the desired pixel object by way of a pointing device coupled to the resource computing platform 26 (FIG. 1) and processed as illustrated in FIG. 6. The selected pixel is captured in step 100. The captured pixel is analyzed in step 102 for either RGB (red, green, blue) values or Hue. In step 104, the system determines whether the hue value is defined. If so, range limits for the hue value are determined in step 106. Alternatively, the RGB color variable value component for the selected pixel may be calculated along with its range limits in step 108. The initial determination of the range limits for the hue or ROB color variables is determined by, for example, ±10 of the Hue or RGB color variable value. After the range limits for either the hue or the RGB color variables have been determined, the system analyzes the pixels in a 10-pixel radius surrounding the selected pixel for pixels with hue/value components falling within the first calculated range limits in step 110. The pixels that fall within these range limits are captured for further analysis. Range values for the pixels captured in step 110 are calculated in step 112.

For example, range limits for the color variables: hue (H), red-green (R-G), green-blue (G-B) and the saturation value$^2$ ($SV^2$) are determined for each of the variables. The range limits are determined by first determining the mean of the color variable from the sample and then for each variable, calculating the range limits to be, for example, 3× the sigma deviation from the mean to set the high and low range limit for each variable. Once the range limit for the variables are determined, known image processing techniques, for example, edge processing techniques, for example, as disclosed on pages 1355-1357 of Hu et al., "Feature Extraction and Matching as Signal Detection" *International Journal of Pattern Recognition and Artificial Intelligence* Vol. 8, No. 6, 1994, pages 1343-1379, hereby incorporated by reference, may be used to determine the boundaries of the color within a frame as indicated in step 114. All of the pixels within the bounding area are captured that fall within the range limits for the variables, hue, R-G, G-V, $SV^2$ in step 116. Next, in step 118, a centroid is calculated for the bounding area and the range limits for the color variables are recalculated in step 118. The recalculated range limits determined in step 118 are used for determination of the edges of the bounding area in step 120 to define a finalized bounding area in step 122 for the object. In step 124, the location of the bounding area of the selected object is determined by capturing the (x, y) coordinates for the upper left corner and the lower right corner as well as the coordinates of the centroid of the bounded area. Thus far, selection of an object in a single frame of the video content has been discussed.

Automatic Pixel Object Tracking

Figure 7:
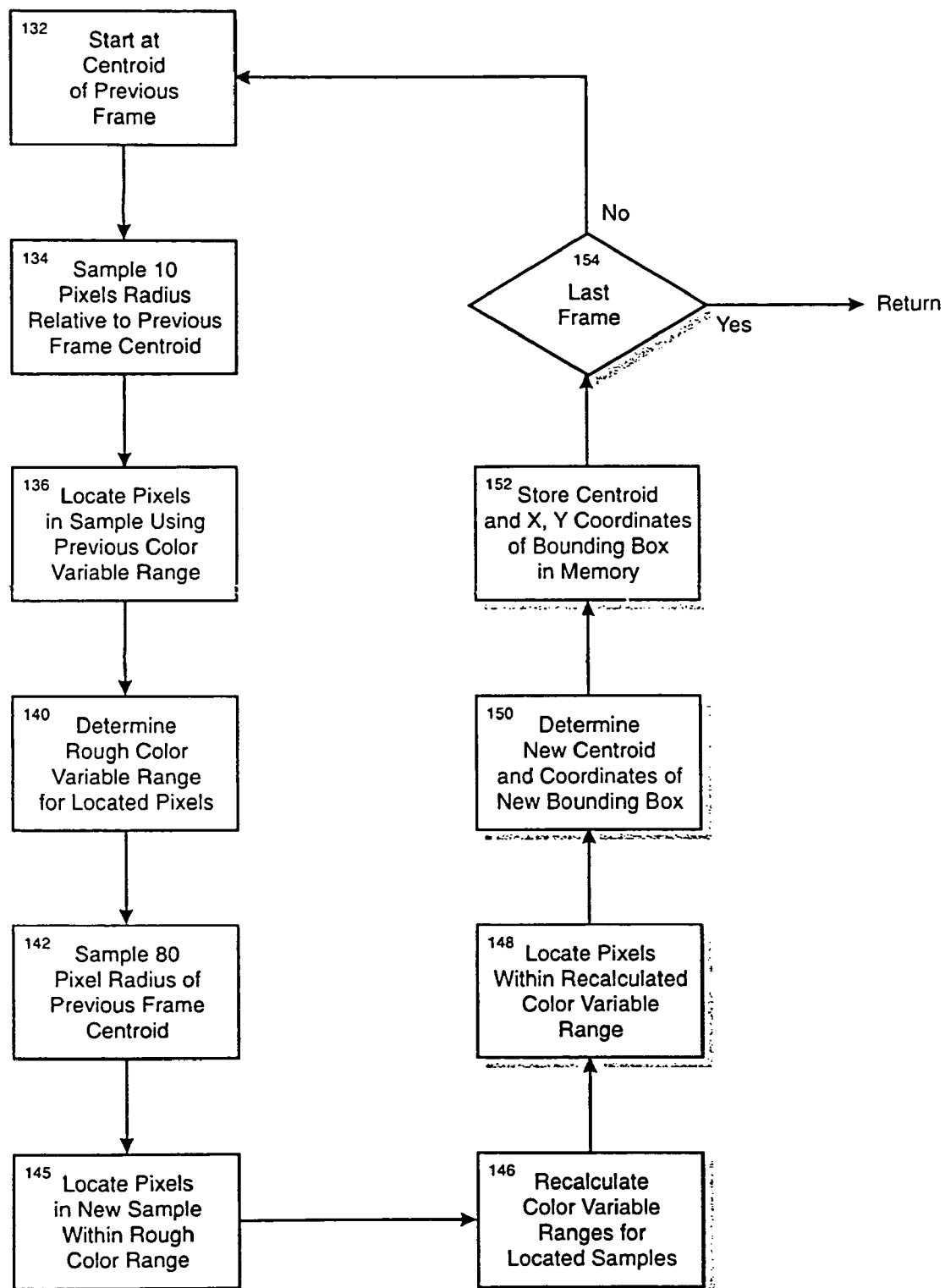
FIG. 7 is a flow diagram of the automatic tracking portion of the imaging processing system in accordance with the present invention.
Figure 8:
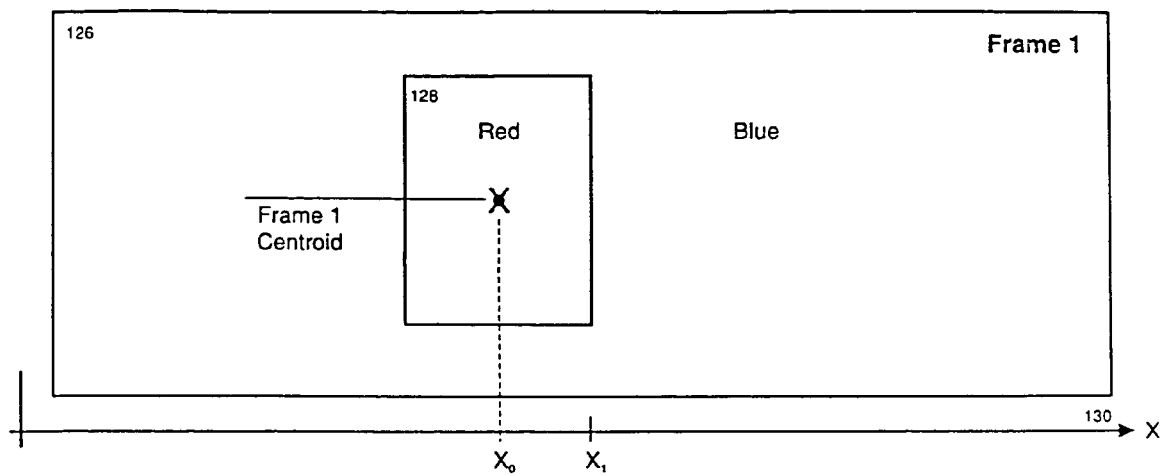
FIG. 8 illustrates the automatic tracking of an exemplary red frame against a blue background for two successive frames.
Figure 8:
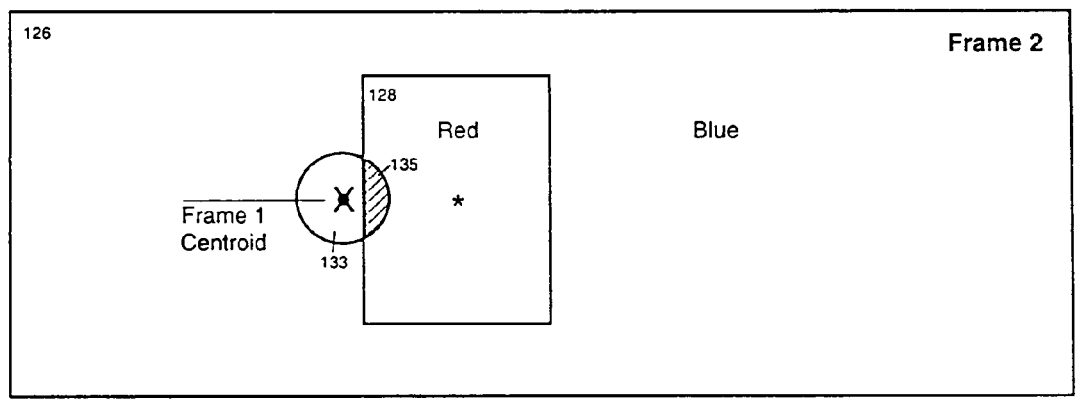
Figure 8:
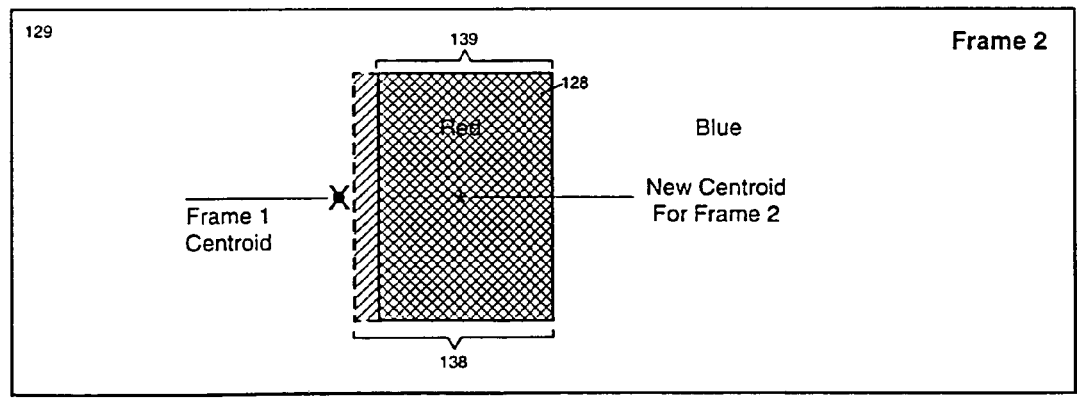

Automatic tracking of the selected pixel object is described in connection with FIGS. 7 and 8. In particular, FIG. 7 represents a flow chart for the automatic tracking system while FIG. 8 represents a visual illustration of the operation of the automatic tracking system. Referring first to FIG. 8, an exemplary frame 126 is illustrated, which, for simplicity, illustrates a red object 128 against a blue background. As shown, the pixel object 128 has a centroid at point) $X_0$ along the $X_1$ axis 130. As shown in frame 2 identified with the reference numeral 129, the example assumes that the pixel object 128 has moved along the x-axis 130 such that its centroid is located at position x1 along the x-axis 130.

Referring to FIG. 7, the video linking application 36 (FIG. 1) begins automatic tracking by starting at the centroid of the previous frame in step 132. Thus, the video linking application 36 samples a 10-pixel radius 133 relative to the previous frame centroid in step 134 as illustrated in FIG. 8. Using the range limits for the color variables previously determined, the video linking application 36 locates pixels in the sample within the previous color variable range in step 136. As shown in FIG. 8, this relates to the cross-hatched portion 138 in frame 126. In order to compensate for variances in the color variables due to lighting effects and decompression effects, the video linking application 36 next determines a rough color variable range for the pixels within the cross-hatched area 135 in step 140 using the techniques discussed above. After the rough color variable range is calculated, the video linking application 36 samples a larger radius, for example, an 80 pixel radius, based on the previous frame centroid in step 142. As shown in FIG. 8, this example assumes that a substantial portion of the pixel object 128 is within the second sample range. In step 145, the pixels in the new sample which fall within the rough color variable range are located and are indicated by the cross-hatched area 138 in FIG. 8. In order to further compensate for variances in the color variables, the video linking application 36 recalculates the color variable ranges for the located samples in step 146. Once the refined color variable range has been determined, the pixels within the recalculated color variable range are located in step 148. As shown by the double cross-hatched area 139 in FIG. 8, the pixels within the recalculated color variable range are illustrated in FIG. 8. As can be seen from FIG. 8, the pixels falling within the rough color range, in the example, are shown to cover a larger area than the pixel object 128. Once the color range values are recalculated in step 146 in the pixels within the recalculated color variable range are determined in step 148 the pixel object 128 is located and in essence filters out pixels falling outside of the pixel object 128 as shown in FIG. 8. Once the pixels are located with the recalculated color variable range in step 148, a new centroid is determined in step 150. In addition to calculating the centroid, the video linking application 36 also determines the coordinates of the new bounding box, for example, as discussed above in connection with steps 120-124. In step 152, the system stores the coordinates of the centroid in the (x, y) coordinates of the bounding box in memory. The system checks in step 154 to determine if the last frame has been processed. If not, the system loops back to step 132 and processes the next frame by repeating steps 134 to 154. As mentioned above, the frame data is extracted from the video content and utilized to define the frames within a segment. Thus, this process may be repeated for all the frames identified in the first frame found and last frame found fields in the developmental graphical user interface 60. Alternatively, the video linking application can be configured to process more frames than those found within segment. However, by breaking down the processing in terms of segments, tracking of the pixel objects will be relatively more accurate because of the differences in the color variable values expected during segment changes.

Linked Video Files

In order to further optimize the image processing of the video linking application 32, the resource computing platform 26 may process all or part of the video frames and store the coordinates in step 152 (FIG. 7), Assuming the fastest possible human reaction time to be ⅓ of a second, it follows that an extraction rate of 10 frames per second will provide adequate tracking information Thus, the linked video files 24 store the centroid coordinates of the upper left and lower right coordinates of the selected objects within the ⅓ second intervals known as clusters. At 30FPS, a cluster is defined as a ten frame segment of video. The file information illustrating object movement contained within the ten frame segment is represented by the co-ordinates used (upper left, and lower right corners) to draw the object bounding boxes. Thus, ten frames of information are compressed into one. The number of frames per cluster depends on the frame rate. Using standard frame rate clusters are defined as follows:

| Standard (FPS = frames/second) | Frames/Cluster |
|---|---|
| NTSC (29.97 FPS) | 10 |
| 30 FPS | 10 |
| PAL (25 FPS) | 8, 8, 9/video section |
| 15 FPS | 5 |
| 12 FPS | 4 |

Since the linked video files 24 are based on a sample rate of three (3) frames per second, the linked video files 21 will be usable at any playback rate of the original content. Moreover, by limiting the sample rate to three (3) frames per second, the linked video files 21 are suitable for narrowband transmission, for example, with a 56 K bit modem as well as broadband streaming applications, such as ISDN, DSL, cable and T1 applications.

Exemplary linked video files 24 are described and illustrated below.

| Exemplary Linked Video File | | | | | |
|---|---|---|---|---|---|
| Line 1: | 569 | 0 | 2172 | 30 | 0 |
| Line 2: | 129 | 0 | 0 | 0 | 0 |
| Line 3: | 001 | 001 | 010 | 4 | 132 |
|  | 002 | 011 | 025 | 4 | 137 |
|  | 003 | 026 | 040 | 4 | 142 |
|  | 004 | 041 | 055 | 4 | 147 |
|  | 005 | 056 | 070 | 4 | 152 |
|  | . |  |  |  |  |
|  | . |  |  |  |  |
|  | . |  |  |  |  |
|  | 128 | 2136 | 2150 | 2 | 564 |
| Line 131: | 129 | 2151 | 2172 | 2 | 567 |
| Line 132: | 001 | 001 | 010 | 4 | 132 |
|  | 6 | 125 | 276 | 199 | 1 |
|  | 138 | 75 | 179 | 119 | 2 |
|  | 213 | 60 | 246 | 83 | 3 |
|  | 207 | 92 | 241 | 117 | 4 |
| Line 137: | 002 | 011 | 025 | 4 | 137 |
|  | 9 | 123 | 278 | 199 | 1 |
|  | 133 | 52 | 177 | 119 | 2 |
|  | 212 | 56 | 250 | 83 | 3 |
|  | 208 | 89 | 243 | 118 | 4 |
| Line 142: | 003 | 026 | 040 | 4 | 142 |
| Line 1 |  |  |  |  |  |
| Line 1: | 569 | 0 | 2172 | 30 | 0 |

The first number in Line 1 (569) identifies the total number of lines in the linked video file 24 file. The next two numbers in Line 1 (0, 2172) are the first and last frame numbers for the movie clip associated with the linked video file 24. The next number in Line 1(30) indicates the playing of the movie clip in frames-per-second.

| Line 2 | | | | | |
|---|---|---|---|---|---|
| Line 2: | 129 | 0 | 0 | 0 | 0 |

Line 2 only uses the first space, and the number in this space indicates the total numbers of video frame "clusters" in the video content.

| Line 3 | | | | | |
|---|---|---|---|---|---|
| Line 3: | 001 | 001 | 010 | 4 | 132 |

In this example, Lines 3-131 contain information on the one hundred twenty-nine (129) video clusters. Each such line follows a similar format. The first number, 001 in this example, is the cluster number. The next two numbers (001, 010) are the starting and ending frames of the video segment. The next number (4) indicates that this video cluster has four clickable areas or objects within it. The final number (132) indicates the line of the linked video file 24 where a detailed description of the video cluster can be found.

| Line 132 | | | | | |
|---|---|---|---|---|---|
| Line 132: | 001 | 001 | 010 | 4 | 132 |
| Line 133: | 6 | 125 | 276 | 199 | 1 |
|  | 138 | 75 | 179 | 119 | 2 |
|  | 213 | 60 | 246 | 83 | 3 |
|  | 207 | 92 | 241 | 117 | 4 |

In this example, the detailed descriptions of the video clusters begins on line 132 for video cluster #1. The first line repeats the general video cluster information from prior in the linked video file 24. Each of the following four lines provide information on a separate clickable area. The first four numbers are the (x,y) coordinates for the upper left corner and the lower right corner, respectively. In Line 133, for instance, (6, 125) are the (x,y) coordinates for the upper left corner and (276, 199) are the (x,y) coordinates for the lower right corner of that video cluster. The last number in the line ("1" in Line 133) is the "link index". The "link index" links the pixel object coordinates with the data object coordinates from the product placement database 36 (FIG. 1).

Playback Mode of Operation

Playback of the video content and linked video files 24 is by way of a video hosting platform 38 and a playback platform 43. As shown in FIG. 1, the video hosting platform 38 is shown separate from the playback platform 42 and connected thereto by either a narrowband or wideband transmission link. The video hosting platform 38 can alternatively be located in the playback platform 43.

The video hosting platform 38 includes a video playback application 42 which supports a common media player API 40 for playback of the video content and provides resources for accessing the linked video files 24 to enable pixel objects to be selected with a standard pointing device, such as a mouse, and linked to one or more data objects.

In particular, the video playback application 42 reads the linked data files 24 and stores these files in two arrays. The first array may be single dimensional and may contain information about the video content and in particular the segments. The second array may be used to provide information regarding the location of the pixel objects of clickable areas for each movie segments. Exemplary code for storing the linked data files into a first array and a second array is provided in an Appendix.

The video playback application 42 supports pixel objects within the video content 22 being selected with a standard pointing device, such as a mouse. The (x, y) coordinates of the location selected by the pointing device and the frame time that the location was selected are captured and compared with information in the linked video files 24 to determine whether the selected location corresponds to a selected pixel object. In particular, the (x, y) coordinates and frame time information of the pointing device are compared to the pixel object file to determine if the selected location in the display area 155 corresponds to a pixel object. This is determined by determining the elapsed time since the beginning of the video content, and multiplying the elapsed time by the playback rate. For example, for a mouse click at 2.5 seconds into the playback, the approximate frame will be 30 based on a 12 frame per second playback rate. Once the approximate frame is determined, the video playback application 42 determines the section from the section break application 55. Upon determining the section, all clickable areas in the section are scanned to determine the clickable area or pixel object that contains the x, y coordinates associated with the mouse click, if any. If so, the system displays the data object that has been linked to the pixel object by way of the link index in the object file in an display window 156. In particular, a data object, which is linked to the pixel object, is displayed. Exemplary code for returning a link index is provided in the Appendix.

The video playback application 42 may also be used to support a graphical user interface 153 as illustrated in FIG. 3. The graphical user interface 153 may include a display area 151 for displaying the video content by way of a common media player API.

The playback application 42 may also provide for additional capability. For example, the graphical user interface 153 may be provided with buttons for categorizing the various data objects that have been linked to the video content. As shown, in FIG. 3, the graphical user interface 153 may include categorical buttons, such as the entertainment, commerce and education buttons 157, 159 and 161 to display the data objects in each of the exemplary categories. These category titles may be customized for each program, and are dynamically written to reflect the content of the program being shown. In this configuration, the data object files are configured with such categorical information. As such, when one of the categorical buttons is selected, all of the selected links in that category are retrieved from the product placement database 36 (FIG. 1) and displayed in the inventory display window 156.

The "Pause on Click" and "Click and Connect" buttons or check boxes 165 and 167 may be provided. The "Pause on Click" button 165, once selected, pauses the video content in the display area 151 to allow a user time to decide whether to connect to an alternate resource platform at the present time after a selected pixel object has been linked to a data object or retrieve the data object from the inventory display window 156 at a later time. The "Click and Connect" button 167 may be used to display the link data object, for example, a web page in the background on the display area of the playback platform 43 outside of the graphical user interface 153, while the video content continues to display in the display window 151.

Additional functionality, such as "Show All Links in a Frame" and "Show All Links in Program" buttons 168 and 169 may also be provided. The "Show All Links in Frame" button 168 displays all links in a given frame in the inventory display window 156 when selected. This function allows a user to scroll through the access content, for example, by way of a scroll buttons 171 to locate the scene or frame in which the desired item appears. Once the frame has been located, the user can click within the displayed frame and all of the available items contained within the display frame are sorted and displayed in the inventory display window 155. The "Show All Links" button 169, when selected, displays all of the data object links to the video content. The data objects are displayed in the inventory display window 155.

A resume video button 172 may be provided. The resume video button 172 is used after selecting an object from the inventory display window 155. In particular, as mentioned above, objects selected from the inventory display window 155 link the application to another resource platform, such as a website. As mentioned above, in a click and connect mode of operation the video content continues to be displayed in the display window 151 in the player while the web page is displayed in the background on the display of the playback platform 42. The resume video button 172 simply allows playback of the video from the point at which the video playback application 42 was linked to another resource platform.

"Hide/Show List", "Login", "Clear List" and "Open Link" buttons 176, 178, 180 and 182 may also be provided. The "Hide/Show List" button 176 may be used to hide or show the functions of the graphical user interface 153. In particular, when the high/show list button 176 is selected, an on/off state is toggled and stored in memory.

The Login button 178 may be used to prevent or limit access by playback platform 43. The login capability may be used to capture valuable data about the user's habit and requested information. In this application, a web server (not shown) may be used to host a database of user information and password information commonly known in the industry. When the Login button 178 is selected, a request is sent from the playback platform 43 to a login web server for authentication. An authentication message may then return to the video hosting platform 38 to enable playback of the linked video content.

The Clear List button 180 may be provided to delete all of the data objects in the inventory display window 155. When the Clear List button 180 is selected the playback application 38 deletes all of the data objects in a temporary memory used for the inventory display window 155.

An Open Link button 182 allows for additional information for selected data objects to be accessed. In particular, once a data object is selected from the inventory display window 155, selection of the open link button 182 may be used to provide any additional information available for the selected data object.

A "thumbnail" display area 184 may be provided to display an image of a selected pixel object in a reduced size, or the frame from which it was selected, or another representational image or advertisement. The video playback application 38 may also support a chat room dialog box 186. The chat room dialog box 186 may be implemented using standard conventional software and provided with additional functionality. For example, images for an object listing within the inventory display area 155 may be dragged into the chat area dialog box 186. In response to such action, the video playback application 38 displays the clickable text space hyperlink in the chat dialog box 186. Clicking on the hyperlink functions transmits the thumbnail to the address generated.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

Exemplary Code for Reading Data into First Array

```
numberOfLine = readFirstNumberOfFirstLine( );
startFrame = readNextNumber ( );
endFrame = readNextNumber ( );
trueFramePerSecond = readNextNumber ( );
numberOfMovieSegment = readFirstNumberOfSecondLine ( );
for (int i=0; i<numberOfMovieSegments; i++) {
    firstArray [i*5] = readNextNumber ( );
    firstArray [i*5+1] = readNextNumber ( );
    firstArray [i*5+2] = readNextNumber ( );
    firstArray [i*5+3] = readNextNumber ( );
    firstArray [i*5+4] = readNextNumber ( );
    numberOfClickableAreas =
        calculateTheSumOfClickableAreas
        (firstArray [i*5+3]);
}
```

Exemplary Code for Reading Data into Second Array

```
for (int i=0; i<numberOfClickableAreas; i++) {
    readLine ( );
    secondArray [i*5] = readNextNumber ( );
    secondArray [i*5+1] = readNextNumber ( );
    secondArray [i*5+2] = readNextNumber ( );
```

-continued

```
        secondArray [i*5+3] = readNextNumber ( );
        secondArray [i*5+4] = readNextNumber ( );
    }
```

Exemplary Code for Returning a Link Index

```
int getLinkIndex(int x, int y, in frameNumber) {
    approximatedFrameNumber = frameNumber *
    trueFramePerSecond / 12;
    segmentNumber = getSegmentNumber (approximateFrameNumber);
    numberOfClickableAreas = firstArray[segmentNumber*5 + 3];
    segmentStart = firstArray[segmentNumber*5 + 4]
                 - numberOfSegments - 3;
                 // 3 is the offset needed due to extra lines
    for (int i=0; i < numberOf ClickableAreas; i++) {
        x0 = secondArray[ (segmentStart + i)*5];
        y0 = secondArray[ (segmentStart + i)*5 + 1];
        x2 = secondArray[ (segmentStart + i)*5 + 2];
        xy2 = secondArray[ (segmentStart + i)*5 + 3];
        if (x0 <= x && x <= x2 && y0 <= y && y <= y2) {
            return secondArray [(segmentStart + i)*5 + 4];
        }
    }
    return -1;
}
```

We claim:

1. An image processing system for processing video content in a sequence of video frames and linking a pixel object embedded in said video content to data corresponding to the pixel object, the image processing system comprising:
    a video capture system for capturing a frame of said sequence of video frames;
    a user interface for enabling a user to select the pixel object in said captured frame, said video capture system determining a range of color values corresponding to the selected pixel object;
    a pixel object tracking system configured to track the selected pixel object through a plurality of the sequence of video frames based on the determined range of color values;
    a video linking system which generates a linked video file that is separate from and not embedded in said sequence of video frames, said linked video file comprising (i) a pixel object file identifying the selected pixel object by frame number and location within the captured video frame and at least one subsequent video frame, and (ii) a separate data object file that includes information related to the object that corresponds to the selected pixel object, the data object file being linked to the corresponding pixel object file, wherein said linked video file is configured to be exportable to a media player so that a location in said sequence of video frames selected by a pointing device during playback of the video frames can be linked with the data object when said selected location corresponds to the selected pixel object;
    wherein said video linking system samples said video content at a sample rate which is a divisor of plural standard playback rates; and
    wherein said video capture system determines the range of color values corresponding to the selected pixel object by:
        (i) determining a value of at least one of (ia) a hue, and (ib) a color variable, of at least one pixel of the selected pixel object,
        (ii) applying a predetermined value range to the determined value,
        (iii) analyzing pixels that (iiia) fall within a predetermined distance of said at least one pixel of the selected pixel object, and (iiib) fall within the applied value range,
        (iv) determining a further range of values based on the analyzed pixels, and
        (v) using the determined range of further values as said range of color values corresponding to the selected pixel object.

2. The system as recited in claim 1, wherein said video linking system samples said video content at a sample rate of a divisor of 30 frames per second and 12 frames per second.

3. The system as recited in claim 2, wherein said sample rate is at least 3 frames per second.

4. The system as recited in claim 1, wherein said video linking system is configured to identify segment breaks in said video content.

5. The system as recited in claim 4, wherein said segment breaks are determined by determining the median average pixel values for a series of frames and comparing changes in the pixel values relative to the median average and indicating a segment break when the change in pixel values represents at least a predetermined change relative to the median average.

6. The image processing system as recited in claim 1, further including a video playback application for playing back video content and said linked video file, wherein said video playback application is configured to (i) determine if locations selected by a pointing device during playback of the video content correspond to said selected pixel object and (ii) provide a link to a corresponding data object when said selected location corresponds to one of said selected pixel object.

7. The system as recited in claim 1, wherein said video linking system samples said video content at a sample rate of a divisor of NTSC and PAL frame rates.

8. The system as recited in claim 1, wherein said video linking system samples said video content at a sample rate of a divisor of NTSC and 12 FPS frame rates.

9. The system as recited in claim 1, wherein said video linking system samples said video content at a sample rate of a divisor of NTSC, PAL, 15 FPS, and 12 FPS frame rates.

10. The system as recited in claim 1, wherein said video linking system samples said video content at a sample rate of a divisor of NTSC and movie frame rates.

11. The system as recited in claim 1, wherein said video linking system clusters the sampled video content with plural frames per cluster.

12. The system as recited in claim 1, further comprising a pixel object tracking system which includes a processor which automatically tracks the selected pixel object in other frames, said pixel object tracking system including a system for automatically determining changes in the characteristics of said pixel object based upon changes in lighting and automatically compensating based upon those changes.

13. An image processing system for processing video content in a sequence of video frames and linking a pixel object embedded in said video content to data corresponding to the pixel object, the image processing system comprising:
    a video capture system for capturing a sequence of video frames;
    a user interface for enabling a user to select a pixel object in at least one of the captured frames, said video capture system determining a range of color values corresponding to the selected pixel object;
    a pixel object tracking system configured to track the selected pixel object through a plurality of the sequence of video frames based on the determined range of color values; and
    a video linking system which generates a linked video file that is separate from and not embedded in said sequence of video frames, said linked video file comprising (i) a pixel object file which identifies, by frame number and location within the frame, the selected pixel object in the captured frame and at least one subsequent frame, and (ii) a separate data object file which includes data that corresponds to the selected pixel object, said linked video file being configured to be exportable to a media player, said video linking system sampling said video content at a sample rate which is a divisor of plural standard playback rates, wherein said video capture system determines the range of color values corresponding to the selected pixel object by:
  (i) determining a value of at least one of (ia) a hue, and (ib) a color variable, of at least one pixel of the selected pixel object,
  (ii) applying a predetermined value range to the determined value,
  (iii) analyzing pixels that (iiia) fall within a predetermined distance of said at least one pixel of the selected pixel object, and (iiib) fall within the applied value range,
  (iv) determining a further range of values based on the analyzed pixels, and
  (v) using the determined range of further values as said range of color values corresponding to the selected pixel object.

14. The system as recited in claim 13, wherein said video linking system samples said video content at a sample rate of a divisor of 30 frames per second and 12 frames per second.

15. The system as recited in claim 13, wherein said sample rate is at least 3 frames per second.

16. The image processing system as recited in claim 13, further including a video playback application for playing back video content and said linked video file, wherein said video playback application is configured to (i) determine if a location selected by a pointing device during playback of the video content corresponds to the selected pixel object and (ii) provide a link to a data object in the data object file when said selected location corresponds to the selected pixel object.

17. The system as recited in claim 13, wherein said video linking system samples said video content at a sample rate of a divisor of NTSC and PAL frame rates.

18. The system as recited in claim 13, wherein said video linking system samples said video content at a sample rate of a divisor of NTSC and 12 FPS frame rates.

19. The system as recited in claim 13, wherein said video linking system samples said video content at a sample rate of a divisor of NTSC, PAL, 15 FPS, and 12 FPS frame rates.

20. The system as recited in claim 13, wherein said video linking system samples said video content at a sample rate of a divisor of NTSC and movie frame rates.

21. The system as recited in claim 13, wherein said video linking system clusters the sampled video content with plural frames per cluster.

22. The system as recited in claim 13, further comprising a pixel object tracking system which includes a processor which automatically tracks said selected pixel object in other frames, said pixel object tracking system including a system for automatically determining changes in the characteristics of said selected pixel object based upon changes in lighting and automatically compensating based upon those changes.

23. An image processing system for processing video content in a sequence of video frames and linking a pixel object embedded in said video content to corresponding data, the image processing system comprising:
  a video capture system for capturing a sequence of video frames;
  a user interface for enabling a user to select a pixel object in at least one of the captured frames, said video capture system determining a range of color values corresponding to the selected pixel object;
  a pixel object tracking system configured to track the selected pixel object through a plurality of the sequence of video frames based on the determined range of color values; and
  a video linking system which generates a linked video file that is separate from and not embedded in said sequence of video frames, said linked video file comprising (i) a pixel object file which identifies, by frame number and location within the frame, the selected pixel object in the at least one captured frame and at least one subsequent frame, and (ii) a separate data object file, linked to the pixel object file, which includes data corresponding to the selected pixel object, said video linking system being configured to be exportable to a media player, said video linking system sampling said video content at a sample rate which is a divisor multiple of plural standard playback rates, said video linking system clustering the sampled video content with plural frames per cluster, wherein said video capture system determines the range of color values corresponding to the selected pixel object by:
  (i) determining a value of at least one of (ia) a hue, and (ib) a color variable, of at least one pixel of the selected pixel object,
  (ii) applying a predetermined value range to the determined value,
  (iii) analyzing pixels that (iiia) fall within a predetermined distance of said at least one pixel of the selected pixel object, and (iiib) fall within the applied value range,
  (iv) determining a further range of values based on the analyzed pixels, and
  (v) using the determined range of further values as said range of color values corresponding to the selected pixel object.

* * * * *